US008689964B2

(12) United States Patent
Bacic

(10) Patent No.: US 8,689,964 B2
(45) Date of Patent: Apr. 8, 2014

(54) PIECE GOODS CONVEYANCE SYSTEM HAVING INDIVIDUAL CONTAINERS FOR TRANSPORTING PIECE GOODS, IN PARTICULAR LUGGAGE

(75) Inventor: Mato Bacic, Nürnberg-Krottenbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/255,957

(22) PCT Filed: Feb. 18, 2010

(86) PCT No.: PCT/EP2010/052050
§ 371 (c)(1),
(2), (4) Date: Sep. 28, 2011

(87) PCT Pub. No.: WO2010/102889
PCT Pub. Date: Sep. 16, 2010

(65) Prior Publication Data
US 2012/0012442 A1 Jan. 19, 2012

(30) Foreign Application Priority Data

Mar. 12, 2009 (DE) .......................... 10 2009 012 499

(51) Int. Cl.
*B65G 47/46* (2006.01)

(52) U.S. Cl.
USPC .................................................. 198/370.06

(58) Field of Classification Search
USPC .................................................. 198/370.06
See application file for complete search history.

(56) References Cited

U.S. PATENT DOCUMENTS

| 2,983,362 | A | * | 5/1961  | Crist, Jr. ........................ 198/547 |
| 3,231,068 | A |   | 1/1966  | Harrison, et al. |
| 3,616,895 | A | * | 11/1971 | LoPresti et al. ............... 198/802 |
| 3,912,071 | A | * | 10/1975 | Nielsen .................... 198/370.06 |

(Continued)

FOREIGN PATENT DOCUMENTS

| DE | 86 34 099 U1 | 2/1987 |
| EP | 03 06 144 A2 | 3/1989 |

OTHER PUBLICATIONS

German Patent and Trademark Office, Office Action Citing Prior Art References, Dated April 30, 2010.

*Primary Examiner* — Gene Crawford
*Assistant Examiner* — Keith R Campbell
(74) *Attorney, Agent, or Firm* — Laurence A. Greenberg; Werner H. Stemer; Ralph E. Locher

(57) ABSTRACT

A piece goods conveyance system has individual containers for transporting luggage on a conveyor belt and an unloading and loading station for loading the containers. The storage space is formed by an endless stable carrier belt spanning each container and driven guided perpendicular to the transport direction of the container. There is a stationary drive for driving the carrier belt in the region of the loading and/or unloading station. In order to create a functional drive for the container that undertakes the transport and sorting of luggage in a cost-effective and low-maintenance manner, a drive element is configured as flat belts circulating endlessly around deflection wheels parallel to the transport direction. At least one deflection wheel is positively connected to the carrier belt and can be frictionally engaged to a second flat belt of a stationary drive station driven endlessly circulating parallel to the first flat belt.

11 Claims, 1 Drawing Sheet

(56) References Cited

U.S. PATENT DOCUMENTS

| | | |
|---|---|---|
| 4,781,281 A | 11/1988 | Canziani |
| 4,884,676 A * | 12/1989 | Suizu ........................ 198/370.06 |
| 6,253,910 B1 * | 7/2001 | Axmann ........................ 198/835 |
| 6,273,268 B1 * | 8/2001 | Axmann ........................ 209/654 |
| 6,292,998 B1 * | 9/2001 | Wiemers ........................ 29/559 |
| 7,104,387 B2 * | 9/2006 | Brixius et al. ........... 198/370.06 |
| 7,503,451 B2 * | 3/2009 | Hirasawa et al. .............. 198/790 |
| 7,987,963 B2 * | 8/2011 | Baum et al. .............. 198/370.06 |
| 2007/0284227 A1 * | 12/2007 | Hinson ........................ 198/818 |

* cited by examiner

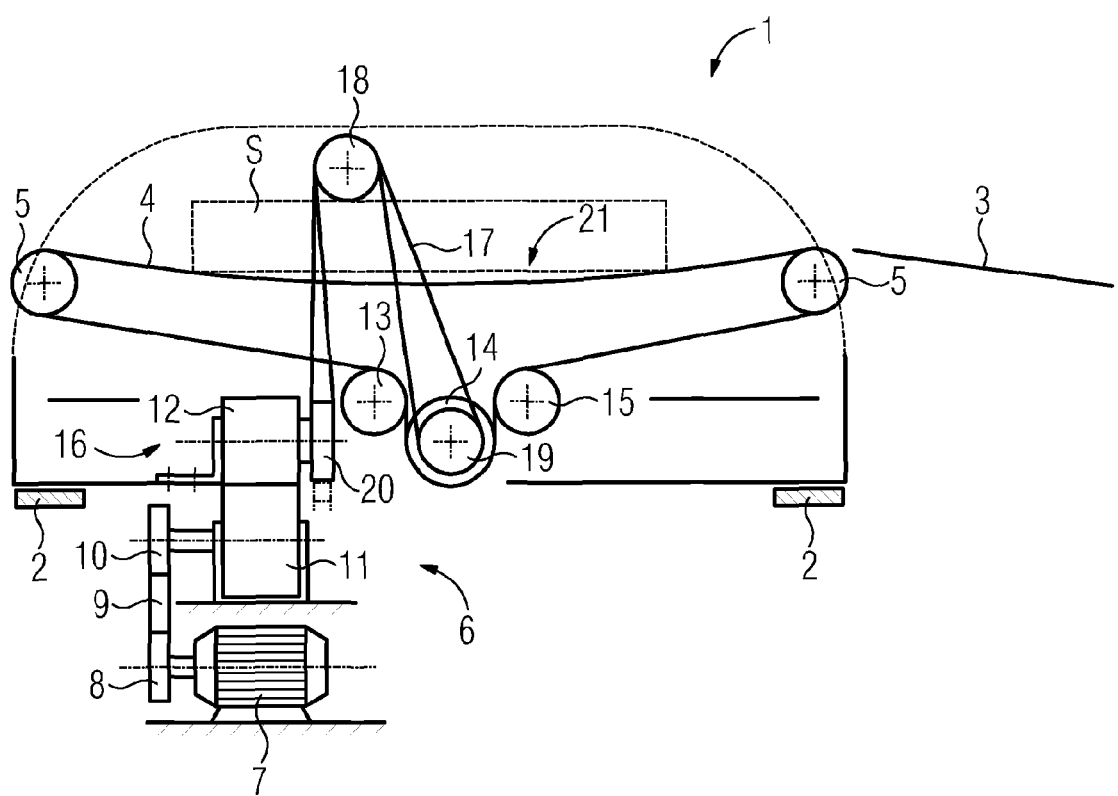

PIECE GOODS CONVEYANCE SYSTEM HAVING INDIVIDUAL CONTAINERS FOR TRANSPORTING PIECE GOODS, IN PARTICULAR LUGGAGE

BACKGROUND OF THE INVENTION

Field of the Invention

The invention relates to a piece goods conveyor installation having individual containers for the transportation of piece goods, in particular of pieces of baggage, on a conveyor track with carrying and guiding elements for the containers and with at least one unloading station for emptying the piece goods out of the containers and/or at least one loading station for loading each container with the piece goods, the bearing surface of which is formed by a load-bearing endless carrying belt which spans each container and which is drivably guided transversely with respect to the direction of transport of the container around a deflecting roller arranged on both sides of the container, there being provided in the region of the loading and/or unloading station, for the purpose of driving the carrying belt, a stationary drive which, at least during the loading and/or unloading operation, can be coupled to at least one drive element, provided on the container, for the carrying belt.

In order to transport any piece goods, in particular pieces of baggage, such as handbags and suitcases, but also packages, individually in a container or the like in a stable position and at high speed via a broadly branched conveyer installation having many changes of direction and, on the other hand, to bring about a rapid and controlled loading or separation of the piece goods and containers in predetermined positions within the conveyor installation, containers of various shapes have been used. In particular, containers of trough shape (trays) are configured so that they satisfy the stringent requirements in the best possible way. In particular, problems are sometimes presented because the different shapes and sizes of the piece goods to be transported have to be taken into account; and above all flexurally slack and rollable pieces of baggage or parts of piece goods have a critical behavior during transport and also during loading and unloading.

It is known to use for the conveyance of baggage conveyor installations in which relatively simple containers formed from plastic are transported on the conveyer track having carrying and guiding elements for the container, which preferably consist of mutually parallel belts which are endlessly driven in rotation and on which the containers lie passively. The disadvantage of these systems is that loading devices and, in particular, unloading devices are required in order to tip the piece goods out of the usually smoothly recessed trays. For this purpose, it is indispensible to use gravity, the result of this, in turn, being that the piece goods are subjected to extreme stress when they are discharged laterally out of the conveyor installation, for example via shoots, or when they are thrown into the containers during loading.

Cross belt conveyors, as they are known, are known from sorting technology, which consist of vehicles which are movable on a conveyor installation and a plurality of which are joined together to form a train or an endlessly rotating vehicle chain, the individual vehicles being provided with a carrying belt which can be driven in rotation transversely with respect to the direction of transport of the vehicles. The piece goods are transported on this carrying belt designed as a cross belt and are conveyed out laterally, transversely with respect to the direction of transport, and on the desired unloading station by means of the drive of the carrying belt. This type of conveying technology can be used to a very restricted extent because of the dependence of the individual vehicles on the laid-out conveying zone and cannot be employed, for example, in large airport installations where there are long distances and different routes. Moreover, the individual carriages of known installations are usually provided with drives which, overall, increase the outlay of such an installation.

So that cross belt conveyors of the known type can be made usable for flight baggage, it has already been proposed to provide the known containers with an endless carrying belt, spanning the container in a load-bearing manner, as a bearing surface for the piece goods, the carrying belt being drivably guided transversely with respect to the direction of transport of the container around deflecting rollers arranged on both sides of the container. The otherwise passive containers are transported through the installation by the conveying technology described above and are steered and controlled on the installation side. By the carrying belt being driven in the region of the loading and/or unloading station, the piece goods are discharged laterally out of the conveyor installation. The drive is effected by means of a stationary drive which is provided in the region of the loading and/or unloading station and which can be coupled positively to at least one drive element, provided on the container, for the carrying belt. The drive element for the carrying belt is a worm drive which, in the loading and/or unloading station, engages on a toothed belt which rotates endlessly around deflecting wheels in parallel with the direction of transport and one deflecting wheel of which is operatively connected via an angle gear to one of the deflecting rollers of the carrying belt. A second toothed belt, endlessly drivable rotatably parallel to the first toothed belt, of a stationary drive station engages positively into this toothed belt.

It has been shown that the positive force transmission is subject to a high wear because the engagements of the toothings of the toothed belts cannot be ensured accurately. Moreover, a high noise emission arises during the intermeshing of the toothed belts as a result of the unavoidable play occurring during tooth engagement.

BRIEF SUMMARY OF THE INVENTION

The object of the present invention is, on the basis of the known prior art, to improve the piece goods conveyor installation having a container for the transportation and sorting of pieces of baggage and to provide a low-wear, simple and functional drive for the containers, which takes over cost-effectively, and with low maintenance, the transport and sorting of piece goods, in particular of pieces of baggage in a baggage conveyor installation.

To achieve the object, it is proposed, according to the invention that the drive element provided on the container is designed as a flat belt which rotates endlessly around deflecting wheels parallel to the direction of transport and at least one deflecting wheel of which is operatively connected to the carrying belt and which, in the region of the loading and/or unloading station, can be brought into frictional connection with a second flat belt, endlessly drivable rotatably parallel to the first belt, of a stationary drive station, the drive speed and drive direction of which second flat belt can be controlled.

The invention dispenses with the positive engagement of two intermeshing toothed belts or chains, along with their disadvantgages, and proposes a purely frictional connection of two flat belts, one of which is driven and takes along the other, which bears on the former, via frictional connection.

In an especially beneficial refinement of the invention, there is provision whereby the flat belt of the drive element provided on the container and the flat belt of the stationary drive station rotate around horizontal axes parallel to one another, and the plane of frictional connection runs essentially horizontally. Force transmission from one flat belt to the other can be generated more easily when the pressure force is applied in a vertical direction. In this case, the dead weight of the container may be used as pressure force or counterforce.

According to a further feature of the invention, there is provision whereby the flat belt of the drive station and the flat belt of the drive element can be pressed one against the other at least during the loading and unloading operation. By an active pressure force being applied, the take-along effect of the frictionally paired flat belts can be improved.

Preferably, there is provision, within the scope of the invention, whereby the flat belt of the drive station can be moved toward the flat belt of the drive element by means of a lifting device at least during the loading and unloading operation. The lifting device may, according to the invention, be designed as a lifting magnet.

In order to conduct the drive force from the drive element further onto the carrying belt for the piece goods, according to a particular feature of the invention the carrying belt spanning the container is guided in the region of its lower strand in an S-shaped manner around three drive rollers, the two outer drive rollers frictionally or positively pressing the carrying belt laterally against the contra-directionally movable central drive roller. The tension-mounting of the carrying belt between the drive rollers ensures that no slip occurs between the rollers and the carrying belt and therefore the carrying belt can be controlled in a defined manner such that piece goods lying on it can be exactly positioned and can be discarded in a directed manner or taken over at an exact location.

According to the invention, the central drive roller of the carrying belt is gear-connected to at least one of the deflecting wheels of the flat belt of the drive element for the transmission of the drive force. According to a preferred proposal of the invention, the drive force for the carrying belt can be transmitted via at least one transmission belt which is endlessly guided, if appropriate looping around a deflecting wheel, via a belt pulley connected coaxially to the deflecting wheel of the drive element and via a belt pulley arranged coaxially on the central drive roller. The drive torque of the stationary drive station is thereby frictionally transmitted, as required, to the drive element, and from there via the transmission belt to the central drive roller which, with the aid of the other two drive rollers bearing against it and against the carrying belt, drive the carrying belt of the container.

Since the axes of the belt pulley of the drive element and of the belt pulley of the drive roller are arranged at right angles to one another as a consequence of construction, according to the invention the transmission belt is rotated on itself through 90°, so that the required deflection of the drive force can take place.

Since the carrying belt is guided in an S-shaped manner and tension-mounted between the drive rollers, it becomes possible for the carrying belt to sag downward, trough-shaped, between the deflecting rollers. By virtue of this measure, even when there are rapid travels through bends, the piece goods lie reliably on the carrying belt, without the risk of being unintentionally thrown off.

The invention provides a very simple functional drive for a container for the transportation of piece goods, in particular of pieces of baggage, on a conventional conveyer track having known carrying and guiding elements. The drive of the carrying belt is simple, cost-effective and low-maintenance, and costly mechanical gears are not required. The individual components are standard parts which can easily be procured.

BRIEF DESCRIPTION OF THE DRAWING

An exemplary embodiment of the invention is illustrated in the drawing and is described below.

DESCRIPTION OF THE INVENTION

In the greatly simplified illustration, the container is designated as a whole by 1, its side wall contours being illustrated by dashes. The container is initially constructed in a known way and is transported passively on a driven conveyer track having carrying and guiding elements for the container. The carrying and guiding elements are indicated at 2, and they consist of toothed or untoothed flat belts, on which the container 1 lies loosely, while the belts are endlessly driven in rotation (perpendicularly to the drawing plane). The loading and unloading of the container 1 takes place in loading and unloading stations along the transport zone. At an unloading station, the piece goods can be discharged, for example via a shoot which is provided laterally with respect to the container and is indicated at 3.

The container 1 is provided with a carrying belt 4 for piece goods S lying on it, for example a piece of flight baggage, which is endlessly guided around deflecting rollers 5 laterally arranged parallel to the direction of transport of the container. The direction of transport of the container 1 is perpendicular to the drawing plane. For driving the carrying belt 4, a stationary drive, which is designated as a whole by 6, is provided in the region of the loading and/or unloading station. Said stationary drive consists of the electric motor 7, on the motor shaft of which a belt pulley 8 is fastened coaxially. Via a belt 9, preferably a toothed belt, the motor torque is transferred to a belt pulley or toothed pulley 10, by means of which the deflecting wheel of a flat belt 11 extending parallel to the direction of transport is driven. The flat belt 11 has a longitudinal extent of the length of the container 1 and is provided with a slip-inhibiting surface.

The flat belt 11 of the stationary drive station 6 is paired frictionally with a drive element 16 which is arranged on the container 1 and which consists mainly of a flat belt 12 of likewise slip-inhibiting design which is likewise guided endlessly around deflecting wheels. The flat belt 12 likewise extends parallel to the direction of transport of the container and is arranged in such a way that the surface of the flat belt 11 of the drive station 6 can be pressed onto the surface of the flat belt 12 of the drive element 16. For this purpose devices (not illustrated) at the drive station 6 may be provided, by means of which the flat belt 11 is pressed upward against the flat belt 12 of the drive element. Force transmission via the toothed belt 9 allows sufficient flexibility for the required pressing movements.

In order to transmit the drive torque from the drive element 16 to the carrying belt 4, the carrying belt 4 is looped in the region of its lower strand around drive rollers 13, 14 and 15 in an S-shaped manner, with the drive rollers 13 and 15 engaging the carrying belt 4 frictionally between themselves and the central drive roller 14. A transmission belt 17 of endless design loops around a belt pulley 19 arranged coaxially on the end face of the central drive roller 14 and is guided from there via a deflecting roller 18 to the belt pulley 20 which, arranged coaxially to the deflecting wheel of the flat belt 12, rotates with the latter. Since the axes of the deflecting wheel of the flat belt 12 and of the central drive roller are arranged at right angles to one another, a rotation of the transmission belt 17 on itself through 90° is necessary so that the drive torque can be transmitted without an angle gear.

Since the carrying belt 4 is tension-mounted virtually between the rollers 13, 14 and 15 around which it is partially looped, the carrying belt 4 can maintain a troughing which is indicated at 21 on the top side of the carrying belt. This troughing 21 ensures that the piece goods S do not fall out laterally during transport, even on bends; however, an easy discharge of the piece goods S, for example via the shoot 3 in the unloading station and a loading of the carrying belt in a loading station are nevertheless likewise possible. Both are possible by the drive direction of the motor 7 being reversed.

The invention claimed is:

1. A piece goods conveyor installation, comprising:
a conveyor track with carrying and guiding elements;
individual containers for a transportation of piece goods on said conveyor track;
at least one drive element disposed on said containers;
at least one unloading and loading station for emptying the piece goods out of said containers and for loading each of said containers with the piece goods;
deflecting rollers;
a load-bearing endless carrying belt defining a bearing surface and spanning each of said containers, said load-bearing endless carrying belt being drivably guided transversely with respect to a direction of transport of said containers around said deflecting rollers disposed on both sides of said containers;
a stationary drive disposed in a region of said loading and unloading station, for driving said load-bearing endless carrying belt, said stationary drive which, at least during a loading or unloading operation, can be coupled to said at least one drive element for driving said load-bearing endless carrying belt;
said at least one drive element disposed on said container has deflecting wheels and a toothless first flat belt which rotates endlessly around said deflecting wheels parallel to the direction of transport;
a transmission belt;
said stationary drive having a drive deflecting wheel and a toothless second flat belt rotating endlessly around said drive deflecting wheel parallel to the direction of transport; and
at least one of said deflecting wheels of said drive element is operatively connected by said transmission belt to said load-bearing endless carrying belt with said transmission belt transmitting a rotation of said at least one of said deflecting wheels of said drive element parallel to the direction of transport to a rotation of said load-bearing endless carrying belt transverse to the direction of travel, and said first flat belt, in a region of said loading and unloading station, can be brought into frictional connection with said second flat belt, being endlessly drivable rotatably parallel to said first flat belt, and a rotational speed and direction of rotation of said second flat belt can be controlled.

2. The piece goods conveyor installation according to claim 1, wherein said first flat belt of said drive element and said second flat belt of said stationary drive station rotate about horizontal axes parallel to one another, and a plane frictional connection runs generally horizontally.

3. The piece goods conveyor installation according to claim 1, wherein said second flat belt of said stationary drive station and said first flat belt of said drive element can be pressed one against the other at least during the loading and unloading operation.

4. The piece goods conveyor installation according to claim 1, further comprising a lifting device and said second flat belt of said stationary drive station can be moved toward said first flat belt of said drive element by means of said lifting device during the loading and unloading operation.

5. The piece goods conveyor installation according to claim 4, wherein said lifting device for said second flat belt of said stationary drive station is a lifting magnet.

6. The piece goods conveyor installation according to claim 1, further comprising:
three drive rollers including a contra-directionally movable central drive roller, said load-bearing endless carrying belt spanning said container is guided in a region of a lower strand in an S-shaped manner around said three drive rollers, two outer drive rollers of said three drive rollers frictionally or positively pressing said load-bearing endless carrying belt laterally against said contra-directionally movable central drive roller.

7. The piece goods conveyor installation according to claim 6, wherein said contra-directionally movable central drive roller for said carrying belt is gear-connected to at least one of said deflecting wheels of said first flat belt of said drive element for a transmission of a drive force.

8. The piece goods conveyor installation according to claim 1, wherein said load-bearing endless carrying belt sags downward, trough-shaped, between said deflecting rollers.

9. The piece goods conveyor installation according to claim 1, wherein the piece goods conveyed by the piece goods conveyor installation are pieces of baggage.

10. A piece goods conveyor installation, comprising:
a conveyor track with carrying and guiding elements;
individual containers for transporting piece goods on said conveyor track;
at least one drive element disposed on said containers;
at least one unloading and loading station for emptying the piece goods out of said containers and for loading each of said containers with the piece goods;
deflecting rollers;
a load-bearing endless carrying belt defining a bearing surface and spanning each of said containers, said load-bearing endless carrying belt being drivably guided transversely with respect to a direction of transport of said containers around said deflecting rollers disposed on both sides of said containers;
a stationary drive disposed in a region of said loading and unloading station, for driving said load-bearing endless carrying belt, said stationary drive which, at least during a loading or unloading operation, can be coupled to said at least one drive element for driving said load-bearing endless carrying belt;
said at least one drive element disposed on said container having deflecting wheels and a toothless first flat belt which rotates endlessly around said deflecting wheels parallel to the direction of transport;
said stationary drive having a toothless second flat belt;
at least one of said deflecting wheels of said drive element is operatively connected to said load-bearing endless carrying belt and said first flat belt, in a region of said loading and unloading station, can be brought into frictional connection with said second flat belt, being endlessly drivable rotatably parallel to said first flat belt, and a rotational speed and direction of rotation of said second flat belt can be controlled;
three drive rollers including a contra-directionally movable central drive roller, said load-bearing endless carrying belt spanning said container being guided in a region of a lower strand in an S-shaped manner around said three drive rollers, two outer drive rollers of said three drive rollers frictionally or positively pressing said load-bearing endless carrying belt laterally against said contra-directionally movable central drive roller;
a further deflecting wheel;
a first belt pulley;
a second belt pulley; and
at least one transmission belt, a drive force for said load-bearing endless carrying belt can be transmitted via said at least one transmission belt which is endlessly guided, looping around said further deflecting wheel, via said first belt pulley connected coaxially to one of said deflecting wheels of said drive element and via said second belt pulley disposed coaxially on said contra-directionally movable the central drive roller.

11. The piece goods conveyor installation according to claim 10, wherein:
said transmission belt is disposed between said first belt pulley being part of said drive element and said second belt pulley being part of said drive roller;
axes of said first and second belt pulleys are disposed at right angles to one another; and
said transmission belt is rotated on itself through 90°.

* * * * *